United States Patent
Comer et al.

(10) Patent No.: US 6,993,076 B1
(45) Date of Patent: Jan. 31, 2006

(54) APPARATUS AND METHOD FOR DERIVING AN ENHANCED DECODED REDUCED-RESOLUTION VIDEO SIGNAL FROM A CODED HIGH-DEFINITION VIDEO SIGNAL

(75) Inventors: Mary Lafuze Comer, Fairmont, IN (US); Thomas Edward Horlander, Indianapolis, IN (US)

(73) Assignee: Thomson Licensing S.A., Boulogne-Billancourt (FR)

(*) Notice: Subject to any disclaimer, the term of this patent is extended or adjusted under 35 U.S.C. 154(b) by 553 days.

(21) Appl. No.: 09/428,322

(22) Filed: Oct. 28, 1999

Related U.S. Application Data (60) Provisional application No. 60/133,429, filed on May 11, 1999.

(51) Int. Cl.
*H04N 7/12* (2006.01)

(52) U.S. Cl. .............................. 375/240.16; 375/240.1; 348/407.1

(58) Field of Classification Search ................ 375/240, 375/240.1, 240.16
See application file for complete search history.

(56) References Cited

U.S. PATENT DOCUMENTS

| | | | |
|---|---|---|---|
| 5,227,878 A | 7/1993 | Puri et al. | 358/136 |
| 5,253,056 A | 10/1993 | Puri et al. | 358/133 |
| 5,341,318 A | 8/1994 | Balkanski et al. | 364/725 |
| 5,371,549 A | 12/1994 | Park | |
| 5,386,241 A | 1/1995 | Park | |
| 5,598,222 A | 1/1997 | Lane | |
| 5,614,952 A | 3/1997 | Boyce et al. | 348/392 |
| 5,614,957 A | 3/1997 | Boyce et al. | 348/567 |
| 5,635,985 A | 6/1997 | Boyce et al. | 348/402 |
| 5,737,019 A | 4/1998 | Kim | 348/390 |
| 5,767,797 A | 6/1998 | Yogeshwar | 341/50 |
| 5,847,771 A | 12/1998 | Cloutier et al. | |
| 5,867,601 A | 2/1999 | Phillips | 382/250 |

FOREIGN PATENT DOCUMENTS

| | | |
|---|---|---|
| EP | 0707426 A2 | 4/1996 |
| WO | 98/41011 | 9/1998 |
| WO | WO9841011 | 9/1998 |

OTHER PUBLICATIONS

Search Report.

*Primary Examiner*—Jeffery Hofsass
(74) *Attorney, Agent, or Firm*—Joseph S. Tripoli; Joseph J. Laks; Ronald H. Kurdyla (57) ABSTRACT

An improved image processing system involves decoding compressed image data including frequency domain coefficients defining blocks of pixel values representing an image at a first resolution to provide an image at a reduced second resolution for display from a selected sub-set of the frequency domain coefficients. The apparatus includes an enhanced motion-compensation-unit (MCU) operating with blocks of pixel values representing an image at an intermediate third resolution lower than the first resolution but higher than the reduced second resolution.

24 Claims, 5 Drawing Sheets

APPARATUS AND METHOD FOR DERIVING AN ENHANCED DECODED REDUCED-RESOLUTION VIDEO SIGNAL FROM A CODED HIGH-DEFINITION VIDEO SIGNAL

This is a non-provisional application of provisional application Ser. No. 60/133,429 by M. L. Corner et al, filed 11 May 1999.

FIELD OF THE INVENTION

The present invention relates to the decoding of a coded high-definition (HD) video signal to derive an enhanced decoded video signal suitable, for example, for recording or producing a picture-in-picture (PIP) or other reduced-resolution display.

DESCRIPTION OF THE PRIOR ART

Known in the art are television receivers that, while displaying a relatively large picture derived from a primary television channel, also simultaneously display a small picture-in-picture (PIP) derived from a secondary television channel. In the case of a high-definition television (HDTV) receiver, the receiver must include a relatively complex and expensive decoder that conforms with the MPEG ISO 13818-2 standard for decoding a received coded HD video signal in real time for high definition display. However, because the PIP is small, there is no need to provide a high definition PIP display because a viewer inherently would not be able to resolve the higher definition components of a high definition PIP. Therefore, to provide the PIP, the HDTV receiver may be supplied with a lower-resolution second simpler and less expensive decoder which still conforms with the ISO 13818-2 standard.

One approach, known in the art, to providing a lower-resolution second decoder which is somewhat simpler and less expensive than the decoder providing the high definition display, is disclosed in the three U.S. Pat. Nos. 5,614,952, 5,614,957 and 5,635,985, which were, respectively, issued to Boyce et al. on Mar. 25, 1997, Mar. 25, 1997 and Jun. 3, 1997.

Further, incorporated herein by reference is the teaching of copending U.S. patent application Ser. No. 09/349,865, filed Jul. 8, 1999 and assigned to the same assignee as the present application, which is directed to a lower-resolution second-decoder approach suitable for deriving a PIP display in real time from a received coded HD video signal that is significantly simpler and less expensive to implement than is the second decoder disclosed by Boyce et al, but still conforms with the ISO 13818-2 standard.

SUMMARY OF THE INVENTION

A system involves decoding compressed image data including frequency domain coefficients defining blocks of pixel values representing an image at a first resolution to provide an image at a reduced second resolution. The system includes a motion-compensation-unit (MCU) processor responsive to a selected sub-set of the frequency domain coefficients for deriving the image of the reduced second resolution. The motion-compensation-unit (MCU) processor employs blocks of pixel values representing image data at an intermediate third resolution lower than the first resolution and higher than the reduced second resolution.

DESCRIPTION OF THE PREFERRED EMBODIMENTS

Figure 1:
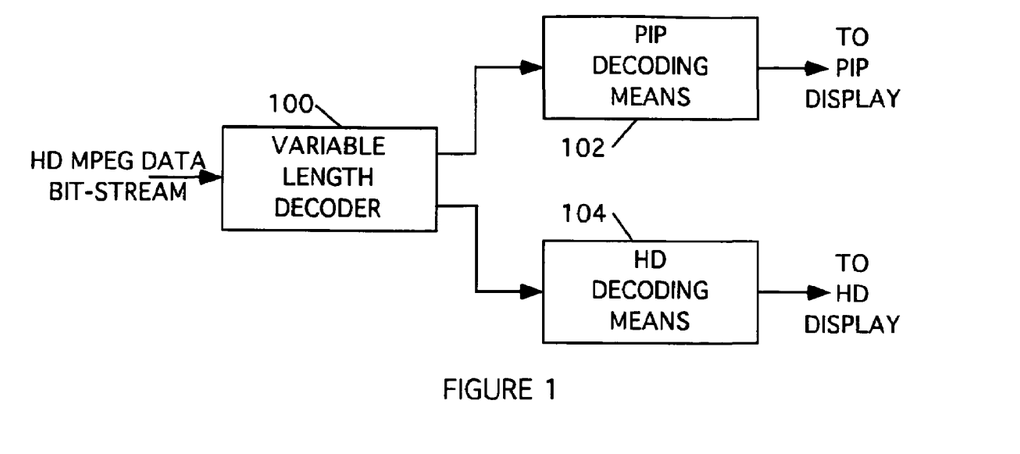
FIG. 1 is a functional block diagram showing a variable-length decoder (VLD) responsive to an input HD MPEG data bit-stream for providing a first selected MPEG data output to a PIP decoding means and a second selected MPEG data output to an HD decoding means.

Referring to FIG. 1, there is shown VLD 100, PIP decoding means 102 and HD decoding means 104. In accordance with the known teaching of the MPEG ISO 13818-2 standard, one of the responses of VLD 100 to the input coded HD MPEG data comprising a sequence of MPEG I, P and B frames is to convey coded picture information defined by each of successive 8×8 blocks of quantized discrete cosine transform (DCT) coefficients as an input to HD decoding means 104. Further, in accordance with the known teaching of the MPEG ISO 13818-2 standard, among the functions performed by HD decoding means 104 is to first perform inverse quantization of each successive 8×8 block of DCT coefficients and then perform inverse discrete cosine transformation (IDCT) of the DCT coefficients of each successive 8×8 block. Finally, HD decoding means 104 must perform motion compensation for each P frame and bi-directionally predictive B frame after IDCT has been performed on that P or B frame.

Figure 1A:
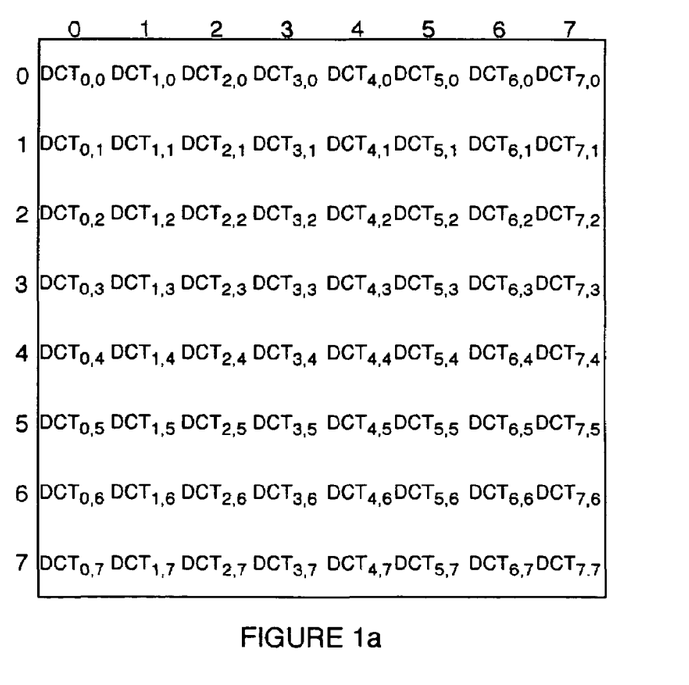
FIG. 1a shows an 8×8 block containing the 64 DCT coefficients that are employed by the HD decoding means of FIG. 1.

FIG. 1a shows an 8×8 block of DCT coefficients, wherein (1) the value of coefficient $DCT_{0,0}$ (located in the upper left corner of the 8×8 block) represents the average (DC) value (i.e., both the horizontal and vertical frequencies are 0) of the picture defined by the 64 values of a corresponding 8×8 block of pixels prior to having undergone DCT, while (2) the value of coefficient $DCT_{7,7}$ (located in the lower right corner of the 8×8 block) represents the highest horizontal frequency and highest vertical frequency components of the picture defined by the 64 values of a corresponding 8×8 block of pixels prior to having undergone DCT. For the case of a HD picture, all, or nearly all, of the 64 DCT coefficients from $DCT_{0,0}$ to $DCT_{7,7}$ inclusive of FIG. 1a may have non-zero values. This results in a relatively large amount of image-processing computation to accomplish IDCT in real time. Further, motion compensation also involves a large amount of real time image-processing computation. Therefore, HD decoding means 104 requires about 96 Mbits memory to temporarily store MPEG decoded image frames prior to display. HD decoding means 104 requires these frames for motion compensation to reconstruct accurate images for display. Thus, a physical implementation of HD decoding means 104 is relatively expensive.

Returning to FIG. 1, another of the responses of VLD 100 to the input coded HD MPEG data is to convey only coded picture information defined by a relatively small given number of lower-frequency-defining, quantized DCT coefficients of each successive 8×8 block as an input to PIP decoding means 102. It is to be noted that the PIP processing and images and the term PIP itself is used herein to encompass any form of reduced resolution image and processing and not just television PIP image generation. While the preferred tutorial example of the PIP decoding means described in the aforesaid patent application Ser. No. 09/349,865 employed only the 6 lowest-frequency quantized DCT coefficients, the preferred tutorial example of enhanced-quality PIP decoding means 102, described in detail below, employs 10 DCT coefficients consisting of $DCT_{0,0}$, $DCT_{1,0}$, $DCT_{2,0}$, $DCT_{3,0}$, $DCT_{0,1}$, $DCT_{1,1}$, $DCT_{2,1}$, $DCT_{0,2}$, $DCT_{1,2}$, and $DCT_{0,3}$ shown in FIG. 1b for progressive-scan use or, alternatively, consisting of $DCT_{0,0}$, $DCT_{1,0}$, $DCT_{2,0}$, $DCT_{0,1}$, $DCT_{1,1}$, $DCT_{0,2}$, $DCT_{0,3}$, $DCT_{0,4}$, $DCT_{0,5}$, and $DCT_{0,6}$ shown in FIG. 1c for interlaced-scan use, thereby providing better high-frequency response for the enhanced PIP display. More specifically, the PIP bitstream received by VLD 100 has been pre-parsed by a VLD-PIP parser (not shown to simplify FIG. 1) to remove from the bitstream DCT coefficients which are not needed by the PIP decoder.

Figure 2:
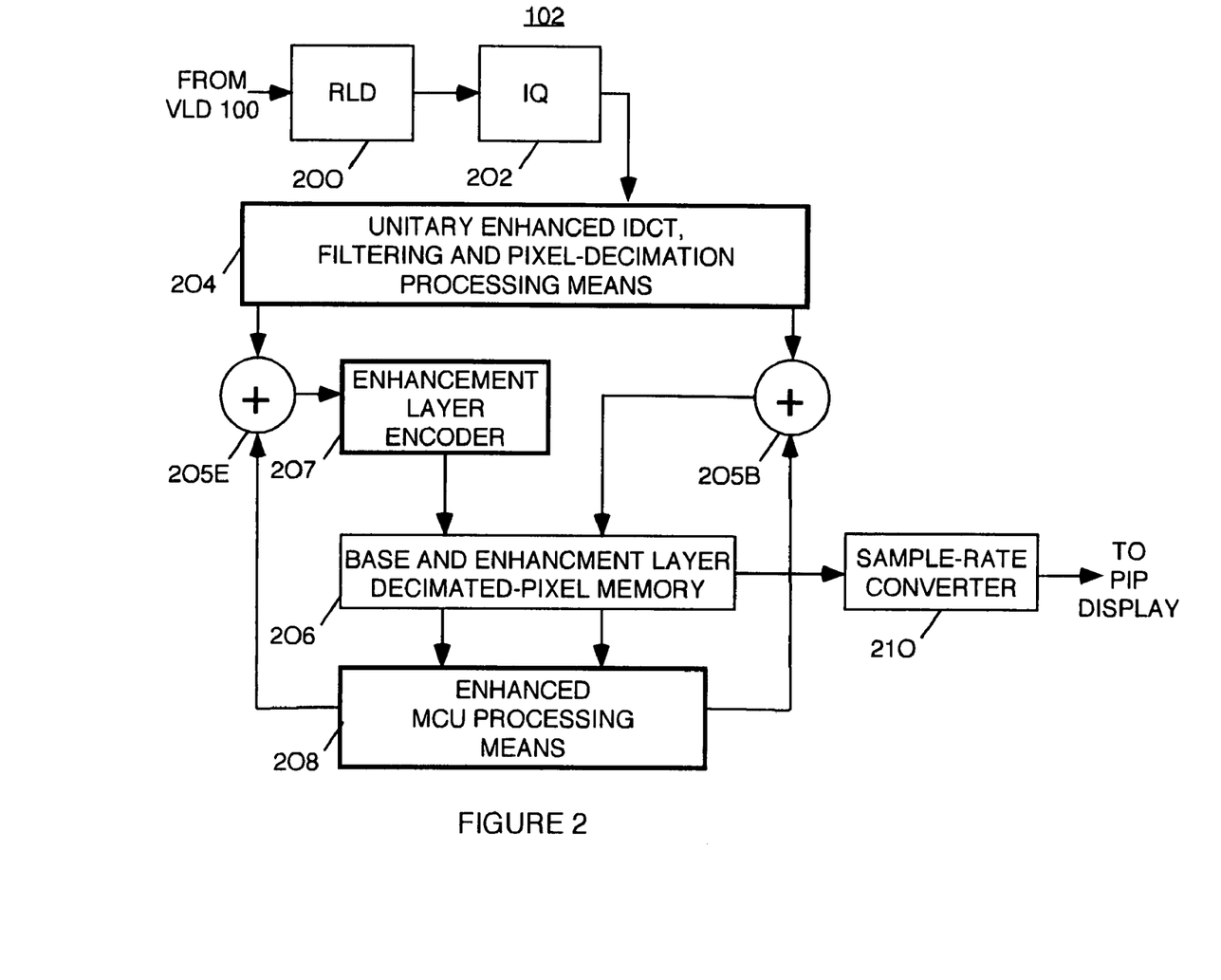
FIG. 2 is a simplified functional block diagram of an embodiment of the PIP decoding means of FIG. 1 which incorporates features of the present invention.

The simplified functional block diagram of the embodiment of enhanced-quality PIP decoding means 102 shown in FIG. 2 comprises runlength decoder (RLD) 200, inverse quantizer (IQ) 202, unitary enhanced IDCT, filtering and pixel-decimation processing means 204, base-layer adder 205B, enhancement-layer adder 205E, base and enhancement-layer decimated pixel memory 206, enhancement-layer encoder 207, enhanced motion compensation unit (MCU) processing means 208 and sample-rate converter 210. Although the simplified functional block diagram of FIG. 2 does not show means for controlling the operation of this embodiment of enhanced-quality PIP decoding means 102, it should be understood that suitable control means that conform with the requirements of the ISO 13818-2 standard is included in a physical implementation of this embodiment.

For illustrative purposes, the following description of elements 200, 202, 204, 205B, 205E, 206, 207, 208 and 210 assumes that each of these elements is being operated in accordance with the above-discussed preferred tutorial example.

Figure 1B:
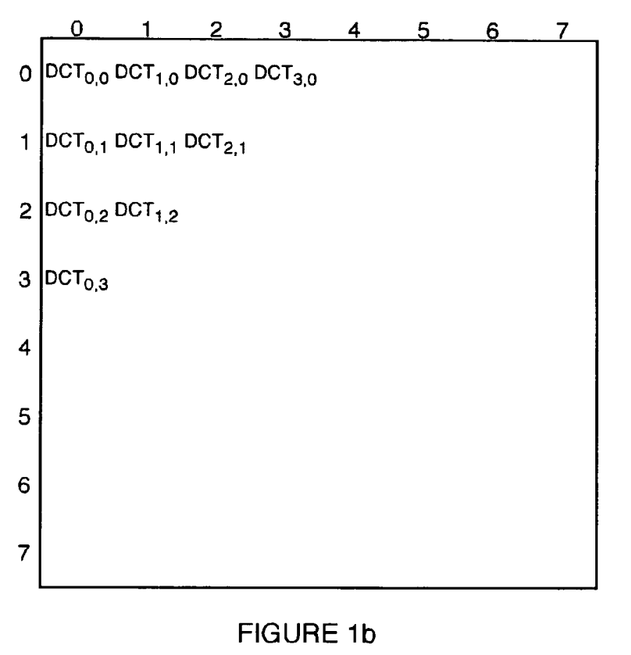
FIG. 1b shows an 8×8 block containing the particular 10 DCT coefficients of the 64 DCT coefficients shown in FIG. 1a that are employed by the PIP decoding means of FIG. 1 for progressive-scan sequences and FIG. 1c shows an 8×8 block containing the particular 10 DCT coefficients of the 64 DCT coefficients shown in FIG. 1a that are employed by the PIP decoding means of FIG. 1 for interlaced-scan sequences.

In this example, RLD 200 outputs 10 DCT coefficients for each 8×8 coded block using the 2 scan patterns defined in the ISO 13818-2 standard. The positioning of the 10 DCT coefficients within each 8×8 block is illustrated in FIG. 1b for progressive scan and in FIG. 1c for interlaced scan, as determined by the state of the progressive_sequence flag. In the FIG. 1b progressive sequence case, if the alternate_scan flag from the picture coding extension for the current picture is 0, the 10 DCT coefficients correspond to coefficients 0,1,2,3,4,5,6,7,8,9 in 1-dimensional scan order, whereas if alternate_scan is 1, the 10 DCT coefficients of interest are coefficients 0,1,2,3,4,5,6,7,8,20 in scan order. In the FIG. 1c interlaced sequence case, if the alternate_scan flag from the picture coding extension for the current picture is 0, the 10 DCT coefficients correspond to coefficients 0,1,2,3,4,5,9,10, 20,21 in 1-dimensional scan order, whereas if alternate_scan is 1, the 10 DCT coefficients of interest are coefficients 0,1,2,3,4,5,6,10,11,12 in scan order. There are two run values that have a meaning in RLD 200 which is different from that described in the ISO 13818-2 standard, depending on the value of the alternate_scan and progressive_sequence flags. For progressive sequences, if alternate_scan is 0, a run value of 10 indicates that the coefficients needed by PIP decoder 102 are all 0 and there is no subsequent non-zero coefficient. Similarly, if alternate_scan is 1, a run value of 21 indicates that the coefficients needed by decoder 102 are all 0 and there is no subsequent non-zero coefficient. For interlaced sequences, if alternate_scan is 0, a run value of 22 indicates that the coefficients needed by PIP decoder 102 are all 0 and there is no subsequent non-zero coefficient. Similarly, if alternate_scan is 1, a run value of 13 indicates that the coefficients needed by decoder 102 are all 0 and there is no subsequent non-zero coefficient. Table 1, summarizes the meaning of run values of 10 and 21 for the two possible values of the alternate_scan flag for progressive sequence and Table 2, summarizes the meaning of run values of 13 and 22 for the two possible values of the alternate_scan flag for interlaced sequence. All other alternate_scan/run value combinations encountered by RLD 200 are interpreted as described in the ISO 13818-2 standard.

TABLE 1

Interpretation of run = 10 and run = 21 by RLD 200 for progressive sequences

| Run | Alternate_Scan | Interpretation in PIP RLD |
|---|---|---|
| 10 | 0 | All DCT coefficients = 0 |
| 10 | 1 | Same as ISO 13818-2 standard |
| 21 | 0 | Not allowed |
| 21 | 1 | All DCT coefficients = 0 |

TABLE 2

Interpretation of run = 13 and run = 22 by RLD 200 for interlaced sequences

| Run | Alternate_Scan | Interpretation in PIP RLD |
|---|---|---|
| 13 | 0 | Same as ISO 13818-2 standard |
| 13 | 1 | All DCT coefficients = 0 |
| 22 | 0 | All DCT coefficients = 0 |
| 22 | 1 | Not allowed |

Figure 1C:
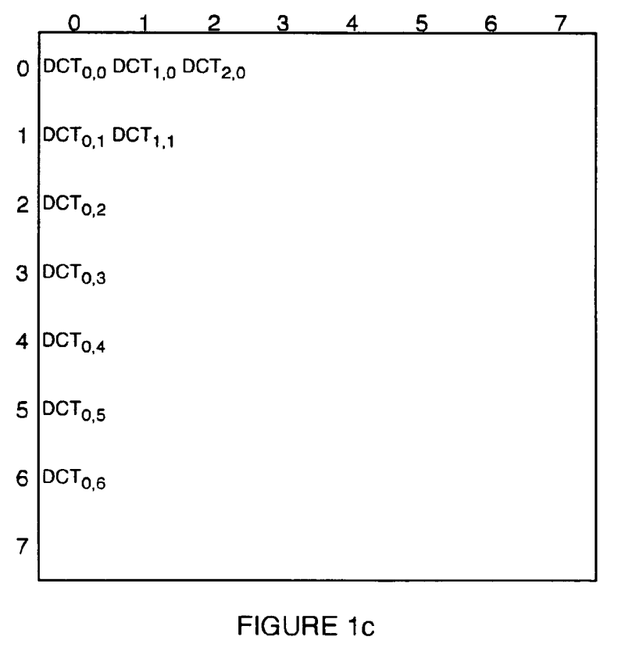

IQ 202 performs inverse quantization arithmetic and saturation described in the ISO 13818-2 standard on the 10 DCT coefficients shown in FIG. 1b for progressive sequences and shown in FIG. 1c for interlaced sequences. The mismatch control portion of the inverse quantization process is not needed. Conventionally, an extensive computational process requiring three separate steps is needed to convert the coded frequency domain information in an 8×8 block at the output from IQ 202, into spatial domain picture information comprising respective values of a smaller block of decimated pixels of a reduced-resolution PIP display image. The first step is to determine the value of each of the 64 (i.e., full pixel density) pixel values of each 8×8 block of picture information as an IDCT function of the inversely-quantized DCT coefficient values. Thereafter, the second step of lowpass filtering followed by the third step of pixel decimation may be performed on the pixels in each successive 8×8 block to provide the desired smaller block of decimated pixels. For instance, a decimation of alternate horizontal and vertical filtered pixels for the case of a progressive scan would result in a 75% reduction in pixel density. Similarly, a decimation of 3 out of 4 successive filtered pixels in the horizontal direction for the case of an interlaced scan would also result in a 75% reduction in pixel density. Thus, in either case, such a decimation performed for luma pixels and also for chroma pixels would result in a reduction in pixel density from 64 per 8×8 block to only 16 per 8×8 block for each of them. However, the amount of hardware required to implement this conventional three-step computational process is relatively large and, therefore, relatively expensive.

In accordance with the principles of the invention taught in the aforesaid patent application Ser. No. 09/349,865, the unitary IDCT, filtering and pixel-decimation processing means disclosed therein is able to convert the coded respective values of inversely-quantized DCT coefficients contained in an 8×8 block at the output from IQ 202, into a smaller block of decimated pixels in a single-step computational process. Thus, the amount of hardware required to implement this single-step computational process by means 204 is relatively small and, therefore, relatively inexpensive compared to the aforesaid conventional three-step computational process.

Specifically, in accordance with the teachings of the aforesaid patent application Ser. No. 09/349,865, the decimated pixel memory thereof (which, because of pixel decimation, requires a storage capacity size of only ¼ the capacity size of a corresponding undecimated pixel memory) comprises a plurality of separate buffers. Each of these buffers is capable of temporarily storing decimated luma and chroma pixels. In conformity with the ISO 13818-2 standard, the decimated pixel memory includes one or more buffers for storing decimated pixels that define reconstructed intracoded (I), predictive-coded (P) and/or bi-directionally predictive-coded (B) frame or field pictures. Further, motion-compensated prediction macroblock output of pixel values from the MCU processing means is added in an adder to each corresponding macroblock output derived in the unitary IDCT, filtering and pixel-decimation processing means. The summed pixel values of the output from the adder are stored into a first buffer of the decimated pixel memory. This first buffer may be a first-in first-out (FIFO) buffer in which the stored decimated pixels may be reordered between (1) being written into the first buffer and (2) being read out from the first buffer and written into another buffer of the decimated pixel memory. In the case of a current P or B frame or field, the decimated pixel memory includes a buffer for storing a macroblock for input to the MCU processing means to provide motion compensation.

In accordance with the principles of the present invention, two layers of decimated pixels are advantageously stored respectively in base and enhancement-layer decimated pixel memory 206 to achieve high-quality motion compensation and improve PIP image quality. The first of these two layers is a base-layer of decimated pixels and the second of these two layers is an enhancement-layer of vector-quantized values of luma macroblock decimated pixels that are employed in enhanced MCU processing means 208 during decoding of P pictures The enhanced layer is used to provide a reduced resolution image of greater resolution than is obtainable by using just the decimated pixels of the base-layer. Both the base-layer and this enhancement-layer are employed by enhanced MCU processing means 208, in a manner described in detail below.

Preferred embodiments of IDCT, filtering and pixel-decimation processing means 204, enhancement-layer encoder 207 and enhanced MCU processing means 208 for implementing the present invention will now be described in detail.

The unitary enhanced IDCT, filtering and pixel-decimation processing means 204 provides the following sets of 16 decimated pixel values for each of the base and enhancement-layers used for each of progressive scan and interlaced scan (each set being a function of 10 DCT coefficient values).

Progressive-Scan, Base-Layer Set of Decimated Pixel Values $g_1(0, 0) = [8DCT_{0,0} + 10DCT_{1,0} + 7DCT_{2,0} + 4DCT_{3,0} + 10DCT_{0,1} +$
$\quad 13DCT_{1,1} + 9DCT_{2,1} + 7DCT_{0,2} + 9DCT_{1,2} + 4DCT_{0,3}]/64$ $g_1(1, 0) = [8DCT_{0,0} + 4DCT_{1,0} - 7DCT_{2,0} - 9DCT_{3,0} + 10DCT_{0,1} +$
$\quad 5DCT_{1,1} - 9DCT_{2,1} + 7DCT_{0,2} + 4DCT_{1,2} + 4DCT_{0,3}]/64$ $g_1(2, 0) = [8DCT_{0,0} - 4DCT_{1,0} - 7DCT_{2,0} + 9DCT_{3,0} + 10DCT_{0,1} -$
$\quad 5DCT_{1,1} - 9DCT_{2,1} + 7DCT_{0,2} - 4DCT_{1,2} + 4DCT_{0,3}]/64$ $g_1(3, 0) = [8DCT_{0,0} - 10DCT_{1,0} + 7DCT_{2,0} - 4DCT_{3,0} + 10DCT_{0,1} -$
$\quad 13DCT_{1,1} + 9DCT_{2,1} + 7DCT_{0,2} - 9DCT_{1,2} + 4DCT_{0,3}]/64$ $g_1(0, 1) = [8DCT_{0,0} + 10DCT_{1,0} + 7DCT_{2,0} + 4DCT_{3,0} + 4DCT_{0,1} +$
$\quad 5DCT_{1,1} + 4DCT_{2,1} - 7DCT_{0,2} - 9DCT_{1,2} - 9DCT_{0,3}]/64$ $g_1(1, 1) = [8DCT_{0,0} + 4DCT_{1,0} - 7DCT_{2,0} - 9DCT_{3,0} + 4DCT_{0,1} +$
$\quad 2DCT_{1,1} - 4DCT_{2,1} - 7DCT_{0,2} - 4DCT_{1,2} - 9DCT_{0,3}]/64$ $g_1(2, 1) = [8DCT_{0,0} - 4DCT_{1,0} - 7DCT_{2,0} + 9DCT_{3,0} + 4DCT_{0,1} -$
$\quad 2DCT_{1,1} - 4DCT_{2,1} - 7DCT_{0,2} + 4DCT_{1,2} - 9DCT_{0,3}]/64$ $g_1(3, 1) = [8DCT_{0,0} - 10DCT_{1,0} + 7DCT_{2,0} - 4DCT_{3,0} + 4DCT_{0,1} -$
$\quad 5DCT_{1,1} + 4DCT_{2,1} - 7DCT_{0,2} + 9DCT_{1,2} - 9DCT_{0,3}]/64$ $g_1(0, 2) = [8DCT_{0,0} + 10DCT_{1,0} + 7DCT_{2,0} + 4DCT_{3,0} - 4DCT_{0,1} -$
$\quad 5DCT_{1,1} - 4DCT_{2,1} - 7DCT_{0,2} - 9DCT_{1,2} + 9DCT_{0,3}]/64$ $g_1(1, 2) = [8DCT_{0,0} + 4DCT_{1,0} - 7DCT_{2,0} - 9DCT_{3,0} - 4DCT_{0,1} -$
$\quad 2DCT_{1,1} + 4DCT_{2,1} - 7DCT_{0,2} - 4DCT_{1,2} + 9DCT_{0,3}]/64$ $g_1(2, 2) = [8DCT_{0,0} - 4DCT_{1,0} - 7DCT_{2,0} + 9DCT_{3,0} - 4DCT_{0,1} +$
$\quad 2DCT_{1,1} + 4DCT_{2,1} - 7DCT_{0,2} + 4DCT_{1,2} + 9DCT_{0,3}]/64$ $g_1(3, 2) = [8DCT_{0,0} - 10DCT_{1,0} + 7DCT_{2,0} - 4DCT_{3,0} - 4DCT_{0,1} +$
$\quad 5DCT_{1,1} - 4DCT_{2,1} - 7DCT_{0,2} + 9DCT_{1,2} + 9DCT_{0,3}]/64$ $g_1(0, 3) = [8DCT_{0,0} + 10DCT_{1,0} + 7DCT_{2,0} + 4DCT_{3,0} - 10DCT_{0,1} -$
$\quad 13DCT_{1,1} - 9DCT_{2,1} + 7DCT_{0,2} + 9DCT_{1,2} - 4DCT_{0,3}]/64$ $g_1(1, 3) = [8DCT_{0,0} + 4DCT_{1,0} - 7DCT_{2,0} - 9DCT_{3,0} - 10DCT_{0,1} -$
$\quad 5DCT_{1,1} + 9DCT_{2,1} + 7DCT_{0,2} + 4DCT_{1,2} - 4DCT_{0,3}]/64$ $g_1(2, 3) = [8DCT_{0,0} - 4DCT_{1,0} - 7DCT_{2,0} + 9DCT_{3,0} - 10DCT_{0,1} +$
$\quad 5DCT_{1,1} + 9DCT_{2,1} + 7DCT_{0,2} - 4DCT_{1,2} - 4DCT_{0,3}]/64$ $g_1(3, 3) = [8DCT_{0,0} - 10DCT_{1,0} + 7DCT_{2,0} - 4DCT_{3,0} - 10DCT_{0,1} +$
$\quad 13DCT_{1,1} - 9DCT_{2,1} + 7DCT_{0,2} - 9DCT_{1,2} - 4DCT_{0,3}]/64$ Progressive-Scan, Enhancement-Layer Set of Decimated PIXEL Values $g_0(0, 0) = [0DCT_{0,0} + 0DCT_{1,0} + 0DCT_{2,0} + 0DCT_{3,0} + 1DCT_{0,1} + 1DCT_{1,1} + 1DCT_{2,1} + 3DCT_{0,2} + 4DCT_{1,2} + 6DCT_{0,3}]/64$ $g_0(1, 0) = [0DCT_{0,0} + 0DCT_{1,0} + 0DCT_{2,0} + 0DCT_{3,0} + 1DCT_{0,1} + 0DCT_{1,1} - 1DCT_{2,1} + 3DCT_{0,2} + 2DCT_{1,2} + 6DCT_{0,3}]/64$ $g_0(2, 0) = [0DCT_{0,0} + 0DCT_{1,0} + 0DCT_{2,0} + 0DCT_{3,0} + 1DCT_{0,1} + 0DCT_{1,1} - 1DCT_{2,1} + 3DCT_{0,2} - 2DCT_{1,2} + 6DCT_{0,3}]/64$ $g_0(3, 0) = [0DCT_{0,0} + 0DCT_{1,0} + 0DCT_{2,0} + 0DCT_{3,0} + 1DCT_{0,1} - 1DCT_{1,1} + 1DCT_{2,1} + 3DCT_{0,2} - 4DCT_{1,2} + 6DCT_{0,3}]/64$ $g_0(0, 2) = [0DCT_{0,0} + 0DCT_{1,0} + 0DCT_{2,0} + 0DCT_{3,0} + 2DCT_{0,1} + 3DCT_{1,1} + 2DCT_{2,1} + 3DCT_{0,2} + 4DCT_{1,2} - 2DCT_{0,3}]/64$ $g_0(1, 2) = [0DCT_{0,0} + 0DCT_{1,0} + 0DCT_{2,0} + 0DCT_{3,0} + 2DCT_{0,1} + 1DCT_{1,1} - 2DCT_{2,1} + 3DCT_{0,2} + 2DCT_{1,2} - 2DCT_{0,3}]/64$ $g_0(2, 2) = [0DCT_{0,0} + 0DCT_{1,0} + 0DCT_{2,0} + 0DCT_{3,0} + 2DCT_{0,1} - 1DCT_{1,1} - 2DCT_{2,1} + 3DCT_{0,2} - 2DCT_{1,2} - 2DCT_{0,3}]/64$ $g_0(3, 2) = [0DCT_{0,0} + 0DCT_{1,0} + 0DCT_{2,0} + 0DCT_{3,0} + 2DCT_{0,1} - 3DCT_{1,1} + 2DCT_{2,1} + 3DCT_{0,2} - 4DCT_{1,2} - 2DCT_{0,3}]/64$ $g_0(0, 4) = [0DCT_{0,0} + 0DCT_{1,0} + 0DCT_{2,0} + 0DCT_{3,0} + 2DCT_{0,1} + 3DCT_{1,1} + 2DCT_{2,1} - 3DCT_{0,2} - 4DCT_{1,2} - 2DCT_{0,3}]/64$ $g_0(1, 4) = [0DCT_{0,0} + 0DCT_{1,0} + 0DCT_{2,0} + 0DCT_{3,0} + 2DCT_{0,1} + 1DCT_{1,1} - 2DCT_{2,1} - 3DCT_{0,2} - 2DCT_{1,2} - 2DCT_{0,3}]/64$ $g_0(2, 4) = [0DCT_{0,0} + 0DCT_{1,0} + 0DCT_{2,0} + 0DCT_{3,0} + 2DCT_{0,1} - 1DCT_{1,1} - 2DCT_{2,1} - 3DCT_{0,2} + 2DCT_{1,2} - 2DCT_{0,3}]/64$ $g_0(3, 4) = 0DCT_{0,0} + 0DCT_{1,0} + 0DCT_{2,0} + 0DCT_{3,0} + 2DCT_{0,1} - 3DCT_{1,1} + 2DCT_{2,1} - 3DCT_{0,2} + 4DCT_{1,2} - 2DCT_{0,3}]/64$ $g_0(0, 6) = [0DCT_{0,0} + 0DCT_{1,0} + 0DCT_{2,0} + 0DCT_{3,0} + 1DCT_{0,1} + 1DCT_{1,1} + 1DCT_{2,1} - 3DCT_{0,2} + 49DCT_{1,2} + 6DCT_{0,3}]/64$ $g_0(1, 6) = [0DCT_{0,0} + 0DCT_{1,0} + 0DCT_{2,0} + 0DCT_{3,0} + 1DCT_{0,1} + 0DCT_{1,1} - 1DCT_{2,1} - 3DCT_{0,2} - 2DCT_{1,2} + 6DCT_{0,3}]/64$ $g_0(2, 6) = [0DCT_{0,0} + 0DCT_{1,0} + 0DCT_{2,0} + 0DCT_{3,0} + 1DCT_{0,1} + 0DCT_{1,1} - 1DCT_{2,1} - 3DCT_{0,2} + 2DCT_{1,2} + 6DCT_{0,3}]/64$ $g_0(3, 6) = [0DCT_{0,0} + 0DCT_{1,0} + 0DCT_{2,0} + 0DCT_{3,0} + 1DCT_{0,1} - 1DCT_{1,1} + 1DCT_{2,1} - 3DCT_{0,2} + 4DCT_{1,2} + 6DCT_{0,3}]/64$ Interlaced-Scan, Base-Layer Set of Decimated Pixel Values $g_1(0, 0) = [8DCT_{0,0} + 7DCT_{1,0} + 11DCT_{0,1} + 10DCT_{1,1} + 10DCT_{0,2} + 0DCT_{2,0} + 9DCT_{0,3} + 8DCT_{0,4} + 6DCT_{0,5} + 4DCT_{0,6}]/64$ $g_1(1, 0) = [8DCT_{0,0} - 7DCT_{1,0} + 11DCT_{0,1} - 10DCT_{1,1} + 10DCT_{0,2} + 0DCT_{2,0} + 9DCT_{0,3} + 8DCT_{0,4} + 6DCT_{0,5} + 4DCT_{0,6}]/64$ $g_1(0, 1) = [8DCT_{0,0} + 7DCT_{1,0} + 9DCT_{0,1} + 9DCT_{1,1} + 4DCT_{0,2} + 0DCT_{2,0} - 2DCT_{0,3} - 8DCT_{0,4} - 11DCT_{0,5} - 10DCT_{0,6}]/64$ $g_1(1, 1) = [8DCT_{0,0} - 7DCT_{1,0} + 9DCT_{0,1} - 9DCT_{1,1} + 4DCT_{0,2} + 0DCT_{2,0} - 2DCT_{0,3} - 8DCT_{0,4} - 11DCT_{0,5} - 10DCT_{0,6}]/64$ $g_1(0, 2) = [8DCT_{0,0} + 7DCT_{1,0} + 6DCT_{0,1} + 6DCT_{1,1} - 4DCT_{0,2} + 0DCT_{2,0} - 11DCT_{0,3} - 8DCT_{0,4} + 2DCT_{0,5} + 10DCT_{0,6}]/64$ $g_1(1, 2) = [8DCT_{0,0} - 7DCT_{1,0} + 6DCT_{0,1} - 6DCT_{1,1} - 4DCT_{0,2} + 0DCT_{2,0} - 11DCT_{0,3} - 8DCT_{0,4} + 2DCT_{0,5} + 10DCT_{0,6}]/64$ $g_1(0, 3) = [8DCT_{0,0} + 7DCT_{1,0} + 2DCT_{0,1} + 2DCT_{1,1} - 10DCT_{0,2} + 0DCT_{2,0} - 6DCT_{0,3} - 8DCT_{0,4} + 9DCT_{0,5} - 4DCT_{0,6}]/64$ $g_1(1, 3) = [8DCT_{0,0} - 7DCT_{1,0} + 2DCT_{0,1} + 2DCT_{1,1} - 10DCT_{0,2} + 0DCT_{2,0} - 6DCT_{0,3} + 8DCT_{0,4} + 9DCT_{0,5} - 4DCT_{0,6}]/64$ $g_1(0, 4) = [8DCT_{0,0} + 7DCT_{1,0} - 2DCT_{0,1} - 2DCT_{1,1} - 10DCT_{0,2} + 0DCT_{2,0} + 6DCT_{0,3} + 8DCT_{0,4} - 9DCT_{0,5} - 4DCT_{0,6}]/64$ $g_1(1, 4) = [8DCT_{0,0} - 7DCT_{1,0} - 2DCT_{0,1} + 2DCT_{1,1} - 10DCT_{0,2} + 0DCT_{2,0} + 6DCT_{0,3} + 8DCT_{0,4} - 9DCT_{0,5} - 4DCT_{0,6}]/64$ $g_1(0, 5) = [8DCT_{0,0} + 7DCT_{1,0} - 6DCT_{0,1} - 6DCT_{1,1} - 4DCT_{0,2} + 0DCT_{2,0} + 11DCT_{0,3} - 8DCT_{0,4} - 2DCT_{0,5} + 10DCT_{0,6}]/64$ $g_1(1, 5) = [8DCT_{0,0} - 7DCT_{1,0} - 6DCT_{0,1} + 6DCT_{1,1} - 4DCT_{0,2} + 0DCT_{2,0} + 11DCT_{0,3} - 8DCT_{0,4} - 2DCT_{0,5} + 10DCT_{0,6}]/64$ $g_1(0, 6) = [8DCT_{0,0} + 7DCT_{1,0} - 9DCT_{0,1} - 9DCT_{1,1} + 4DCT_{0,2} + 0DCT_{2,0} + 2DCT_{0,3} - 8DCT_{0,4} + 11DCT_{0,5} - 10DCT_{0,6}]/64$ $g_1(1, 6) = [8DCT_{0,0} - 7DCT_{1,0} - 9DCT_{0,1} + 9DCT_{1,1} + 4DCT_{0,2} + 0DCT_{2,0} + 2DCT_{0,3} - 8DCT_{0,4} + 11DCT_{0,5} - 10DCT_{0,6}]/64$ $g_1(0, 7) = [8DCT_{0,0} + 7DCT_{1,0} - 11DCT_{0,1} - 10DCT_{1,1} + 10DCT_{0,2} + 0DCT_{2,0} - 9DCT_{0,3} + 8DCT_{0,4} - 6DCT_{0,5} + 4DCT_{0,6}]/64$ $g_1(1, 7) = [8DCT_{0,0} - 7DCT_{1,0} - 11DCT_{0,1} + 10DCT_{1,1} + 10DCT_{0,2} + 0DCT_{2,0} - 9DCT_{0,3} + 8DCT_{0,4} - 6DCT_{0,5} + 4DCT_{0,6}]/64$ Interlaced-Scan, Enhancement-Layer Set of Decimated Pixel Values $g_0(0, 0) = [0DCT_{0,0} + 3DCT_{1,0} + 0DCT_{0,1} + 4DCT_{1,1} + 0DCT_{0,2} + 7DCT_{2,0} + 0DCT_{0,3} + 0DCT_{0,4} + 0DCT_{0,5} + 0DCT_{0,6}]/64$ $g_0(2, 0) = [0DCT_{0,0} + 3DCT_{1,0} + 0DCT_{0,1} + 4DCT_{1,1} + 0DCT_{0,2} - 7DCT_{2,0} + 0DCT_{0,3} + 0DCT_{0,4} + 0DCT_{0,5} + 0DCT_{0,6}]/64$ $g_0(0, 1) = [0DCT_{0,0} + 3DCT_{1,0} + 0DCT_{0,1} + 4DCT_{1,1} + 0DCT_{0,2} + 7DCT_{2,0} + 0DCT_{0,3} + 0DCT_{0,4} + 0DCT_{0,5} + 0DCT_{0,6}]/64$ $g_0(2, 1) = [0DCT_{0,0} + 3DCT_{1,0} + 0DCT_{0,1} + 4DCT_{1,1} + 0DCT_{0,2} - 7DCT_{2,0} + 0DCT_{0,3} + 0DCT_{0,4} + 0DCT_{0,5} + 0DCT_{0,6}]/64$ $g_0(0, 2) = [0DCT_{0,0} + 3DCT_{1,0} + 0DCT_{0,1} + 2DCT_{1,1} + 0DCT_{0,2} + 7DCT_{2,0} + 0DCT_{0,3} + 0DCT_{0,4} + 0DCT_{0,5} + 0DCT_{0,6}]/64$ -continued $$g_0(2, 2) = [0DCT_{0,0} + 3DCT_{1,0} + 0DCT_{0,1} + 2DCT_{1,1} + 0DCT_{0,2} - 7DCT_{2,0} + 0DCT_{0,3} + 0DCT_{0,4} + 0DCT_{0,5} + 0DCT_{0,6}]/64$$

$$g_0(0, 3) = [0DCT_{0,0} + 3DCT_{1,0} + 0DCT_{0,1} + 1DCT_{1,1} + 0DCT_{0,2} + 7DCT_{2,0} + 0DCT_{0,3} + 0DCT_{0,4} + 0DCT_{0,5} + 0DCT_{0,6}]/64$$

$$g_0(2, 3) = [0DCT_{0,0} + 3DCT_{1,0} + 0DCT_{0,1} + 1DCT_{1,1} + 0DCT_{0,2} - 7DCT_{2,0} + 0DCT_{0,3} + 0DCT_{0,4} + 0DCT_{0,5} + 0DCT_{0,6}]/64$$

$$g_0(0, 4) = [0DCT_{0,0} + 3DCT_{1,0} + 0DCT_{0,1} - 1DCT_{1,1} + 0DCT_{0,2} + 7DCT_{2,0} + 0DCT_{0,3} + 0DCT_{0,4} + 0DCT_{0,5} + 0DCT_{0,6}]/64$$

$$g_0(2, 4) = [0DCT_{0,0} + 3DCT_{1,0} + 0DCT_{0,1} - 1DCT_{1,1} + 0DCT_{0,2} - 7DCT_{2,0} + 0DCT_{0,3} + 0DCT_{0,4} + 0DCT_{0,5} + 0DCT_{0,6}]/64$$

$$g_0(0, 5) = [0DCT_{0,0} + 3DCT_{1,0} + 0DCT_{0,1} - 2DCT_{1,1} + 0DCT_{0,2} + 7DCT_{2,0} + 0DCT_{0,3} + 0DCT_{0,4} + 0DCT_{0,5} + 0DCT_{0,6}]/64$$

$$g_0(2, 5) = [0DCT_{0,0} + 3DCT_{1,0} + 0DCT_{0,1} - 2DCT_{1,1} + 0DCT_{0,2} - 7DCT_{2,0} + 0DCT_{0,3} + 0DCT_{0,4} + 0DCT_{0,5} + 0DCT_{0,6}]/64$$

$$g_0(0, 6) = [0DCT_{0,0} + 3DCT_{1,0} + 0DCT_{0,1} - 4DCT_{1,1} + 0DCT_{0,2} + 7DCT_{2,0} + 0DCT_{0,3} + 0DCT_{0,4} + 0DCT_{0,5} + 0DCT_{0,6}]/64$$

$$g_0(2, 6) = [0DCT_{0,0} + 3DCT_{1,0} + 0DCT_{0,1} - 4DCT_{1,1} + 0DCT_{0,2} - 7DCT_{2,0} + 0DCT_{0,3} + 0DCT_{0,4} + 0DCT_{0,5} + 0DCT_{0,6}]/64$$

$$g_0(0, 7) = [0DCT_{0,0} + 3DCT_{1,0} + 0DCT_{0,1} - 4DCT_{1,1} + 0DCT_{0,2} + 7DCT_{2,0} + 0DCT_{0,3} + 0DCT_{0,4} + 0DCT_{0,5} + 0DCT_{0,6}]/64$$

$$g_0(2, 7) = [0DCT_{0,0} + 3DCT_{1,0} + 0DCT_{0,1} - 4DCT_{1,1} + 0DCT_{0,2} - 7DCT_{2,0} + 0DCT_{0,3} + 0DCT_{0,4} + 0DCT_{0,5} + 0DCT_{0,6}]/64$$

Each of the above "Progressive-Scan Set of Decimated Pixel Values" and above "Interlaced-Scan Set of Decimated Pixel Values" was derived in the following manner:

1. If $DCT_{u,v}$ denotes the DCT coefficient with horizontal frequency index u and vertical frequency index v, then the IDCT equation which would be used to decode a block denoted f(x,y) at full resolution (where x=0, ... ,N−1; y=0, ... ,N−1) is given by $$f(x, y) = \frac{2}{N}\sum_{u=0}^{N-1}\sum_{v=0}^{N-1} C(u)C(v)DCT_{u,v}\cos\frac{(2x+1)u\pi}{2N}\cos\frac{(2y+1)v\pi}{2N} \quad (1)$$

2. Using only the 10 DCT coefficients shown in FIG. 1b, gives the approximation equation 2 for progressive-scan sequences $$f(x, y) \approx \frac{2}{N}\begin{bmatrix} \frac{1}{2}DCT_{0,0} + \frac{1}{\sqrt{2}}DCT_{1,0}\cos\frac{(2x+1)\pi}{2N} + \\ \frac{1}{\sqrt{2}}DCT_{2,0}\cos\frac{(2x+1)2\pi}{2N} + \\ \frac{1}{\sqrt{2}}DCT_{3,0}\cos\frac{(2x+1)3\pi}{2N} + \\ \frac{1}{\sqrt{2}}DCT_{0,1}\cos\frac{(2y+1)\pi}{2N} + \\ DCT_{1,1}\cos\frac{(2x+1)\pi}{2N}\cos\frac{(2y+1)\pi}{2N} + \\ \frac{1}{\sqrt{2}}DCT_{0,2}\cos\frac{(2y+1)2\pi}{2N} + \\ DCT_{2,1}\cos\frac{(2x+1)2\pi}{2N}\cos\frac{(2y+1)\pi}{2N} + \\ DCT_{1,2}\cos\frac{(2x+1)\pi}{2N}\cos\frac{(2y+1)2\pi}{2N} + \\ \frac{1}{\sqrt{2}}DCT_{0,3}\cos\frac{(2y+1)3\pi}{2N} \end{bmatrix} \quad (2)$$

3. Using only the 10 DCT coefficients shown in FIG. 1c, gives the approximation equation 3 for interlaced-scan sequences $$f(x, y) \approx \quad (3)$$

$$\frac{2}{N}\begin{bmatrix} \frac{1}{2}DCT_{0,0} + \frac{1}{\sqrt{2}}DCT_{1,0}\cos\frac{(2x+1)\pi}{2N} + \\ \frac{1}{\sqrt{2}}DCT_{2,0}\cos\frac{(2x+1)2\pi}{2N} + \frac{1}{\sqrt{2}}DCT_{0,1}\cos\frac{(2y+1)\pi}{2N} + \\ DCT_{1,1}\cos\frac{(2x+1)\pi}{2N}\cos\frac{(2y+1)\pi}{2N} + \\ \frac{1}{\sqrt{2}}DCT_{0,2}\cos\frac{(2y+1)2\pi}{2N} + \frac{1}{\sqrt{2}}DCT_{0,3}\cos\frac{(2y+1)3\pi}{2N} + \\ \frac{1}{\sqrt{2}}DCT_{0,4}\cos\frac{(2y+1)4\pi}{2N} + \frac{1}{\sqrt{2}}DCT_{0,5}\cos\frac{(2y+1)5\pi}{2N} + \\ \frac{1}{\sqrt{2}}DCT_{0,6}\cos\frac{(2y+1)6\pi}{2N} \end{bmatrix}$$

4. Let the right-hand side of each of equations 2 and 3 be denoted f'(x,y). In the case of a progressive scan (i.e., the progressive_sequence flag is 1), the base-layer value $g_1'(x,y)$ is computed in accordance with the following equation 4 and the enhancement-layer value $g_0'(x,y)$ is computed in accordance with the following equation 5:

$$g_1'(x, y) = \quad (4)$$
$$\frac{1}{4}[f'(2x, 2y) + f'(2x+1, 2y) + f'(2x, 2y+1) + f'(2x+1, 2y+1)]$$
for x = 0, ... , 3; y = 0, ... , 3.

$$g_0'(x, y) = \quad (5)$$
$$\frac{1}{4}[f'(2x, y) + f'(2x+1, y) - f'(2x, y+1) - f'(2x+1, y+1)]$$
for x = 0, ... , 3; y = 0, 2, 4, 6.

More specifically, $g_1'(x,y)$ in equation 4 defines the average value of the values of a set of 4 contiguous pixels (or prediction errors) arranged in a 2×2 block portion of the full-resolution 8×8 block. The value $g_0'(x,y)$ in equation 5 defines the difference between the average value of the values of a first set of 2 contiguous horizontal pixels (or prediction errors) of one vertical line and the average value of the values of a second set of 2 contiguous horizontal pixels (or prediction errors) of the following vertical line arranged in a 2×2 block portion of the full-resolution 8×8 block. The 16 equations $g_1(0,0)$ to $g_1(3,3)$ of the above "Progressive-Scan, Base-layer Set of Decimated Pixel Values" were derived by substituting equation 2 into equation 4, substituting numeric values for x and y in $g_1'(x,y)$, substituting N=8, and approximating the weighting factors for the DCT coefficients with rational values. The 16 equations $g_0(0,0)$ to $g_0(3,6)$ of the above "Progressive-Scan, Enhancement-layer Set of Decimated Pixel Values" were derived in a similar manner by substituting equation 2 into equation 5, substituting numeric values for x and y in $g_0'(x,y)$, substituting N=8, and approximating the weighting factors for the DCT coefficients with rational values. Although the effective pixel decimation of the enhancement-layer is only 2 (rather than being the effective pixel decimation of 4 of the base-layer), the equalities $g_0(x,y+1)=-g_0(x,y)$ hold for y=0,2,4,6, so that enhancement-layer values with odd vertical indexes need not be computed. Thus, only 16 independent $g_0(x,y)$ enhancement-layer values need be computed for each 8×8 luma block in a progressive-scan I or P picture. Further, because these 16 $g_0(x,y)$ enhancement-layer values are residual values, they tend to have a small dynamic range.

In the case of an interlaced scan (i.e., the progressive_sequence flag is 0), the base-layer value $g_1'(x,y)$ is computed in accordance with the following equation 6 and the enhancement-layer value $g_0'(x,y)$ is computed in accordance with the following equation 7:

$$g_1'(x, y) = \frac{1}{4}[f'(4x, y) + f'(4x+1, y) + f'(4x+2, y) + f'(4x+3, y)] \quad (6)$$
$$\text{for } x = 0, 1; y = 0, \ldots, 7.$$

$$g_0'(x, y) = \frac{1}{4}[f'(2x, y) + f'(2x+1, y) - f'(2x+2, y) - f'(2x+3, y)] \quad (7)$$
$$\text{for } x = 0, 2; y = 0, \ldots, 7.$$

In the interlaced-scan case of an 8×8 block, $g_1'(x,y)$ in equation 6 defines the average value of the values of a set of 4 contiguous pixels (or prediction errors) arranged in a 4×1 block portion of the 8×8 block. The value $g_0'(x,y)$ in equation 7 defines the difference between the average value of the values of a first set of 2 contiguous horizontal pixels (or prediction errors) of a vertical line and the average value of the values of a second set of the next 2 contiguous horizontal pixels (or prediction errors) of the same vertical line arranged in a 4×1 block portion of an 8×8 block. The 16 equations $g_1(0,0)$ to $g_1(1,7)$ of the above "Interlaced-Scan, Base-layer Set of Decimated Pixel Values" were derived by substituting equation 3 into equation 6, substituting numeric values for x and y in $g_1(x,y)$, substituting N=8, and approximating the weighting factors for the DCT coefficients with rational values. The 16 equations $g_0(0,0)$ to $g_0(2,7)$ of the above "Interlaced-Scan, Enhancement-layer Set of Decimated Pixel Values" were derived in a similar manner by substituting equation 3 into equation 7, substituting numeric values for x and y in $g_0'(x,y)$, substituting N=8, and approximating the weighting factors for the DCT coefficients with rational values. Although the effective pixel decimation of the enhancement-layer is only 2 (rather than the effective pixel decimation of 4 of the base-layer), the equalities $g_0(x+1,y)=-g_0(x,y)$ hold for x=0 and x=2 so that enhancement-layer values with odd horizontal indexes need not be computed. Thus, only 16 independent $g_0(x,y)$ enhancement-layer values need be computed for each 8×8 luma block in an interlaced-scan I or P picture. Further, because these 16 $g_0(x,y)$ enhancement-layer values are residual values, they tend to have a small dynamic range.

Returning to FIG. 2, unit 204 conveys an output comprising successive 8×8 blocks of I, P and B luma and chroma $g_1(x,y)$ base-layer decimated pixel values as a first input to base-layer adder 205B in a predetermined order. (For non-coded blocks all such values are zero). This predetermined order includes the decimated pixel values of each 2×2 array of 8×8 pixel luma blocks and each of two chroma blocks which form a decimated macroblock for use by enhanced MCU processing means 208. Further, unit 208 applies a corresponding block $p_1(x,y)$ of base-layer decimated pixel values as a second input to base-layer adder 205B in this same predetermined order (For intra-coded macroblocks all such values are zero). The block $s_1(x,y)$ of base-layer decimated pixel values derived as a sum output from base-layer adder 205B are then stored in memory 206.

Unit 204 conveys an output comprising the I and P luma $g_0(x,y)$ enhancement-layer decimated pixel values as a first input to enhancement-layer adder 205E in the previously mentioned decimated-pixel macroblock predetermined order. (For non-coded blocks all such values are zero). Further, for the case of P luma pixels, unit 208 applies a corresponding macroblock of 64 $p_0(x,y)$ enhancement-layer decimated pixel values as a second input to adder 205E in this same predetermined order. (For intra-coded macroblocks all such values are zero). The macroblock of 64 $s_0(x,y)$ enhancement-layer decimated pixel values derived as a sum output from adder 205E are applied as an input to enhancement-layer encoder 207 and then the encoded output bit-words from encoder 207 are stored in memory 206 during decoding of I and P pictures.

A macroblock at the higher resolution of the enhancement-layer would normally comprise 128 decimated luma pixel values. However, because of the above-described symmetry equalities for both progressive-scan sequences and interlaced-scan sequences, the number of independent decimated enhancement-layer pixel values in the block $s_0(x,y)$ is reduced from 128 to 64. Therefore, the predetermined order is such that only half of the enhancement-layer decimated pixel values need be considered by enhancement-layer encoder 207. These enhancement-layer values are encoded in pairs using a simple vector quantizer, with each pair of values being represented by an 8-bit codeword. Since there are 64 enhancement-layer values to be encoded in a macroblock, the number of bits of storage for the enhancement layer is 32×8=256 bits per macroblock. In the preferred embodiment the 32 codewords are combined into two 128-bit output words from encoder 207 for storage in memory 206.

For progressive sequences each pair of horizontally adjacent values in the block $s_0(x,y)$ is encoded as a two-dimensional vector, whereas for interlaced sequences each pair of vertically adjacent (within the same field) values in $s_0(x,y)$ is encoded as a two-dimensional vector. Let $v_0$ and $v_1$ be a pair of values to be encoded together. The computational procedure employed by encoder 207 to encode the pair $v_0, v_1$ is described in detail in Appendix A. After this procedure has been completed for each pair of values in $s_0(x,y)$, the codewords are packed into two 128-bit words, both of which 128-bit words form the output from encoder 207 that are stored in memory 206. Returning again to FIG. 2, memory 206 provides (1) a base-layer output $d_1(x,y)$ to unit 208 ($d_1(x,y)$ is similar in content to the base-layer input $s_1(x,y)$ provided to memory 206) and (2) an enhancement-layer output to unit 208 (similar in content to the enhancement-layer input to memory 206).

In order for enhanced MCU processing means 208 to form a block of predictions, a block of pixel values is fetched from memory 206. The base-layer of pixel values which are read from the stored reference picture are denoted $d_1(x,y)$. The enhancement-layer residual values, which are needed only if the block of predictions being formed is for the luma component in a P picture, are denoted $d_0(x,y)$. Since the enhancement-layer samples are stored in memory 206 in encoded form, the enhancement-layer data output from memory 206 input to unit 208 is decoded by enhancement-layer decoder 300 (FIG. 3) to obtain the $d_0(x,y)$ values. Unit 208 separately forms individual luma or chroma outputs for field prediction operations corresponding to the top and bottom field prediction blocks. In a bi-directionally predicted macroblock these operations are performed separately for the forward and backward predictions and the results are combined as described in the ISO 13818-2 standard. In the following detailed description of the computational-processing operations performed by unit 208, the symbol / represents integer division with truncation of the result toward minus infinity, the symbol // represents integer division with truncation of the result toward zero, and the symbol % represents the modulus operator, which is defined such that if x is a negative number and M is a positive number, then $x \% M = M - ((x//M)*M - x)$.

Before a block of samples can be read from memory 206, the location and size of the block is determined. The location of a block of pixel values in the reference picture is specified by the horizontal and vertical coordinates of the start (i.e., the upper-left corner) of the block in the reference picture. For the base-layer, these coordinates are indexes into a picture which is ¼ horizontal, full vertical resolution for interlaced sequences and ½ horizontal, ½ vertical resolution for progressive sequences. For the enhancement-layer, the coordinates are indexes into a picture which is ½ horizontal, full vertical resolution for both interlaced and progressive sequences.

To locate the blocks $d_1(x,y)$ and $d_0(x,y)$ in the reference picture, the motion vector for the macroblock being decoded is needed. The decoding of motion vector data in the bitstream, the updating of motion vector predictors, and the selection of motion vectors in non-intra macroblocks which contain no coded motion vectors (e.g., skipped macroblocks) are all performed by unit 208 as described in the ISO 13818-2 standard. Let $x_b$ and $y_b$ be the full-resolution horizontal and vertical positions of the macroblock being decoded and let $mv=(dx,dy)$ be the decoded motion vector, so that if the sequence were being decoded at full resolution, a block of pixel values at location $(x_b+(dx/2), y_b+(dy/2))$ in the full-resolution reference luma picture would be read from memory and used to form luma predictions. Similarly, a block of chroma values at location $(x_b/2+(dx//2), y_b/2+(dy//2))$ in the reference chroma picture would be needed to form predictions for each of the 2 chroma components in a full-resolution mode.

The location in the reference picture of a block needed for motion compensation in unit 208 is determined using $x_b$, $y_b$, dx and dy. Table 3, shows the locations of blocks for various prediction modes. The sizes of the blocks needed for motion compensation in unit 208 are specified in Table 4. Base-layer entries in Table 4 give the size of the block $d_1(x,y)$, and enhancement-layer entries in Table 4 give the size of the block $d_0(x,y)$.

TABLE 3

Locations of Blocks Needed for Motion Compensation in Enhanced MCU Processing Means 208

| Prediction Mode | Horizontal Coordinate | Vertical Coordinate |
| --- | --- | --- |
| Progressive sequence, luma, base-layer | $((x_b + (dx/2))/8)*4$ | $(y_b + (dy/2))/2$ |
| Progressive sequence, luma, enhancement-layer | $((x_b + (dx/2))/8)*4$ | $((y_b + (dy/2))/2)*2$ |
| Progressive sequence, chroma | $x_b/4 + ((dx//2)/4)$ | $y_b/4 + ((dy//2)/4)$ |
| Interlaced sequence, luma, base-layer | $((x_b + (dx/2))/8)*2$ | $y_b + (dy/2)$ |
| Interlaced sequence, luma, enhancement-layer | $((x_b + (dx/2))/8)*4$ | $y_b + (dy/2)$ |
| Interlaced sequence, chroma | $x_b/8 + ((dx//2)/8)$ | $y_b/2 + ((dy//2)/2)$ |

TABLE 4

Sizes of Blocks Needed for Motion Compensation in Enhanced MCU Processing Means 208

| Prediction Mode | Horizontal Size | Vertical Size |
| --- | --- | --- |
| Progressive sequence, luma, base-layer | 12 | 9 |
| Progressive sequence, luma, enhancement-layer | 12 | 18 |
| Progressive sequence, chroma | 5 | 5 |
| Interlaced sequence, luma, 16 × 16 prediction, base-layer | 6 | 17 |
| Interlaced sequence, luma, 16 × 8 prediction, base-layer | 6 | 9 |
| Interlaced sequence, luma, 16 × 16 prediction, enhancement-layer | 12 | 17 |
| Interlaced sequence, luma, 16 × 8 prediction, enhancement-layer | 12 | 9 |
| Interlaced sequence, chroma, 8 × 8 prediction | 3 | 9 |
| Interlaced sequence, chroma, 8 × 4 prediction | 3 | 5 |

Figure 3:
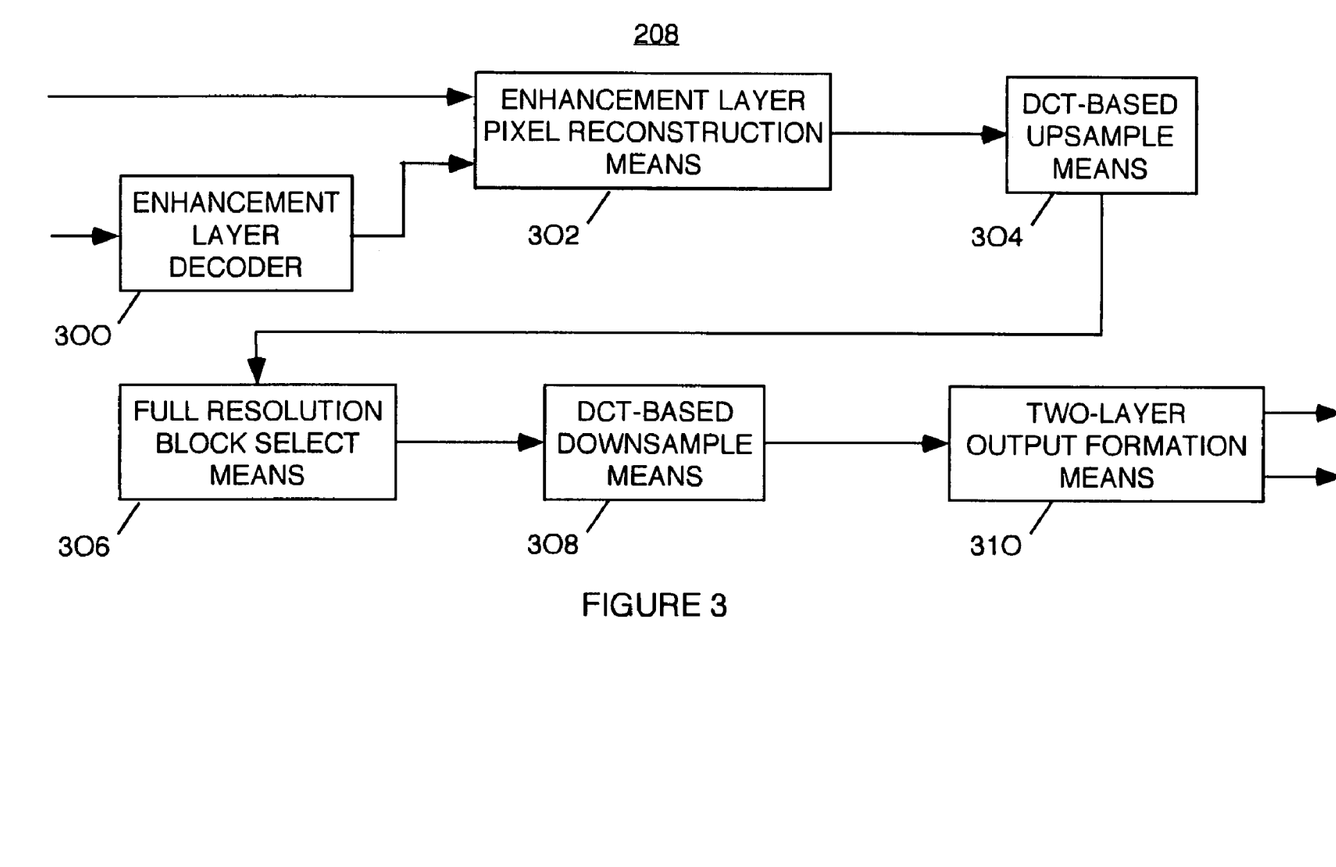
FIG. 3 is a functional block diagram showing details of the enhanced MCU processing means of FIG. 2.
Figure 4:
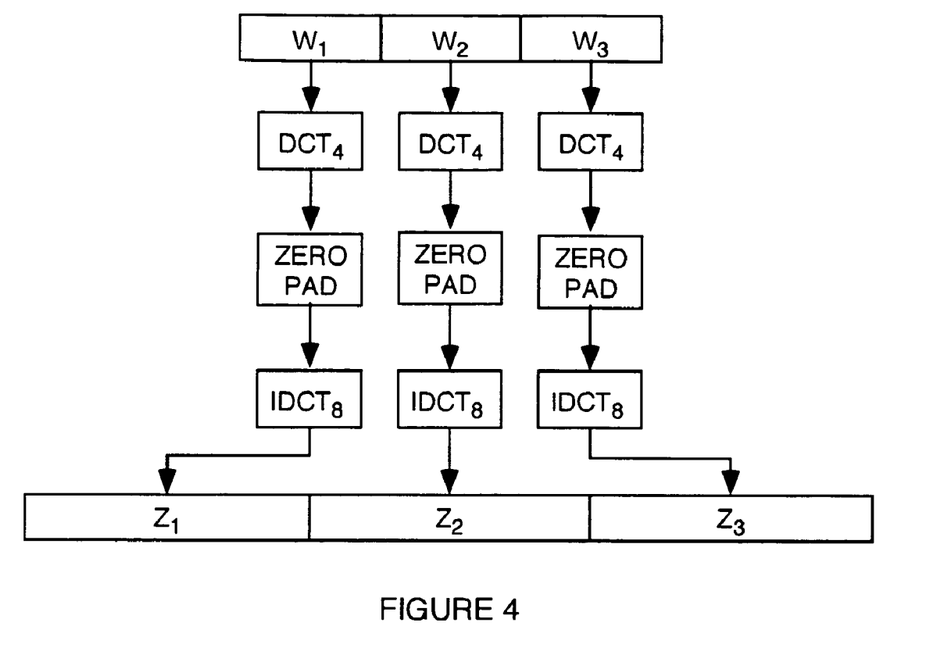
FIG. 4 is a conceptual diagram showing the computational processing performed by the DCT-based upsample means of FIG. 3.
Figure 5:
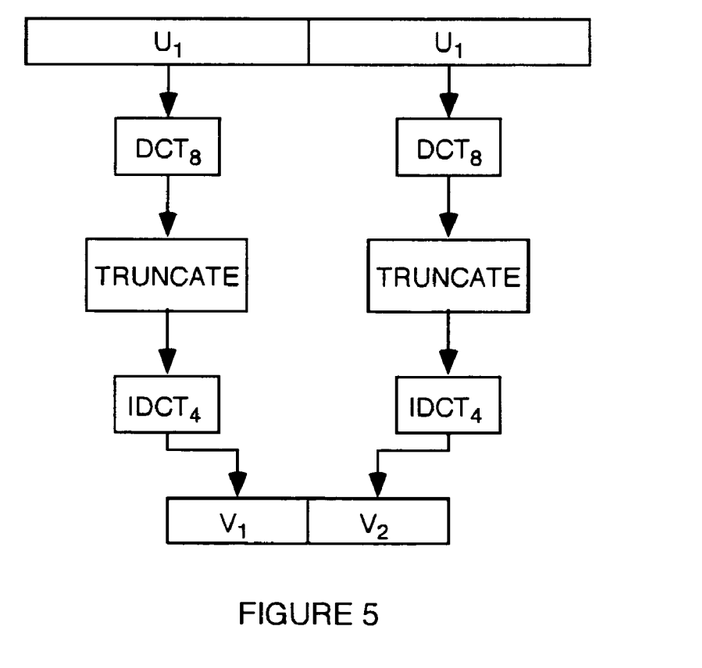
FIG. 5 is a conceptual diagram showing the computational processing performed by the DCT-based downsample means of FIG. 3.

FIG. 3 shows the processing performed on the luma samples read from memory 206 by unit 208. As shown in FIG. 3, the luma-processing portion of unit 208 comprises enhancement-layer decoder means 300, enhancement-layer pixel reconstruction means 302, DCT-based upsample means 304, full-resolution block select means 306, DCT-based downsample means 308 and two-layer output formation means 310. These elements of enhanced MCU processing means 208 use the reduced-resolution blocks from I and P frames stored in memory 206 to form predictions for a decoded macroblock.

The above-described structure of FIG. 3 performs computational processing of luma pixel values input to unit 208 from memory 206. This computational process is described in detail in appendices B to G. Briefly, however, decoder 300 unpacks the input 128-bit words into 16 constituent 8-bit codewords. Decoder 300, employing the computational processing described in appendix B, derives $d_0(x,y)$ as an output. Enhancement-layer pixel reconstruction means 302, employing the computational processing described in appendix C, derives $r_0(x,y)$ as an output in response to both the $d_1(x,y)$ input to unit 208 and the $d_0(x,y)$ output from decoder 300. DCT-based upsample means 304, employing the computational processing described in appendix D, horizontally upsamples the $r_0(x,y)$ input to derive $r(x,y)$ at full resolution. Full-resolution block select means 306, employing the computational processing described in appendix E, uses $r(x,y)$ to derive a full-resolution block of predictions $p(x,y)$ as an output. DCT-based downsample means 308, employing the computational processing described in appendix F, horizontally downsamples the $p(x,y)$ input to derive $q(x,y)$ at half horizontal resolution. The block $q(x,y)$ is applied as an input to two-layer output formation means 310, which employs the computational processing described in appendix G, to derive the outputs $p_1(x,y)$ and $p_0(x,y)$ provided by unit 208 to adders 205B and 205E shown in FIG. 2. Although the computational processing required for chroma predictions are not shown in FIG. 3, they are described in detail in appendix H.

Returning again to FIG. 2, a video signal comprising the base-layer pixels defining each of successive picture fields or frames is output from memory 206 and input to sample-rate converter 210 which derives a display video signal output. The display video signal output from unit 210 represents a PIP display image. By way of example, assume that the size of a PIP display is intended to occupy ⅓ of the horizontal dimension and ⅓ of the vertical dimension of the entire HD display size. If the original resolution of the HD bit-stream is 1920×1080 interlaced, then the PIP decoded frames (in which the number of pixels in the horizontal direction has been decimated by a factor of ¾) are 480×1080 interlaced. Assuming a 1920×1080 interlaced HD display, the displayed PIP frames should be 640×360 interlaced. Therefore, in this example, the decoded frames stored in memory must be scaled by sample-rate converter 210 by a factor of 4/3 in the horizontal direction and ⅓ in the vertical direction.

In a realized embodiment of the present invention, the extra capacity required in 1 memory for storage of the ½ resolution enhancement-layer in encoded form adds only 1.98 Mbits to the 17.8 Mbits required for storage of the ¼ resolution base-layer. Thus, the inclusion of an encoded ½ resolution enhancement-layer increases the needed storage capacity of the base and enhancement-layer decimated-pixel memory by a relatively small amount (i.e., only a little more than 11%) to 19.78 Mbits.

What is claimed is:

1. In apparatus for decoding compressed image data including frequency domain coefficients defining blocks of pixel values representing an image at a first resolution to provide an image at a reduced second resolution for display, said apparatus comprising:
   first means responsive to a selected sub-set of said frequency domain coefficients for deriving said image of said reduced second resolution for display and including,
   enhanced motion-compensation-unit (MCU) processing means; and
   second means for operating said enhanced MCU processing means with blocks of pixel values representing said image at an intermediate third resolution lower than said first resolution and higher than said reduced second resolution.

2. The apparatus defined in claim 1, wherein
   said reduced second resolution is substantially ¼ of said first resolution; and
   said second means operates said enhanced MCU processing at an intermediate third resolution which is substantially ½ of said first resolution.

3. The apparatus defined in claim 1, wherein
   said image at said reduced second resolution for display is a progressive-scanned image.

4. The apparatus defined in claim 1, wherein
   said image at said reduced second resolution for display is an interlaced-scanned image.

5. In apparatus for decoding compressed image data including frequency domain coefficients defining blocks of pixel values representing an image at a first resolution to provide an image at a reduced second resolution for display, said apparatus comprising:
   first means responsive to a selected sub-set of said frequency domain coefficients for deriving said image of said reduced second resolution for display and including,
   enhanced motion-compensation-unit (MCU) processing means; and
   second means for operating said enhanced MCU processing means with blocks of pixel values representing said image at an intermediate third resolution lower than said first resolution and higher than said reduced second resolution, wherein
   said enhanced MCU processing means is responsive to base-layer pixel macroblock input values representing said image at said reduced second resolution and to pixel values representing said image at said intermediate third resolution for deriving motion-compensated base-layer prediction macroblock output pixel values as a first output and motion-compensated enhancement-layer prediction macroblock output pixel residual values as a second output.

6. The apparatus defined in claim 5 wherein
   said second means comprises third means responsive to said selected sub-set of said frequency domain coefficients and to both said motion-compensated base-layer macroblock output pixel values and said enhancement-layer macroblock output pixel residual values for deriving both said base-layer macroblock input pixel values and said encoded enhancement-layer macroblock input pixel residual values.

7. The apparatus defined in claim 5, wherein said second means comprises:
   a base and enhancement-layer decimated-pixel memory;
   unitary enhanced inverse discrete cosine transform (DCT), filtering and pixel-decimation processing means responsive to a selected sub-set of frequency domain coefficients for deriving base-layer blocks of output pixel values representing said image at said reduced second resolution as a first output and output enhancement-layer blocks of output pixel residual values representing said image at said intermediate third resolution as a second output;
   fourth means, including a first adder for adding corresponding pixel values of said motion-compensated base-layer macroblock output pixel values from said enhanced MCU processing means and said base-layer blocks of output pixel values from said unitary IDCT, filtering and pixel-decimation processing means, for deriving values that are stored as base-layer data in said base and enhancement-layer decimated-pixel memory;

fifth means, including a second adder and an enhancement-layer encoder, for adding corresponding pixel residual values of said motion-compensated enhancement-layer macroblock output pixel residual values from said enhanced MCU processing means to said enhancement-layer blocks of output pixel residual values from said unitary IDCT, filtering and pixel-decimation processing means to obtain a sum output from said second adder for encoding by said enhancement-layer encoder, for deriving second input values that are stored as encoded enhancement-layer data in said base and enhancement-layer decimated-pixel memory; and sixth means for providing from said base and enhancement-layer decimated-pixel memory said base-layer pixel macroblock input values to said enhanced MCU processing means and for deriving said encoded enhancement-layer pixel macroblock input residual values applied as a second input to said enhanced MCU processing means from said stored encoded enhancement-layer data.

8. The apparatus defined in claim 5, wherein
said frequency domain coefficients define image information that includes luma blocks of pixel values representing intracoded (I) and predictive-coded (P) progressive-scanned image at said first resolution.

9. The apparatus defined in claim 7, including
seventh means comprising a sample-rate converter for deriving an ongoing display video signal from base-layer blocks of output pixel values.

10. The apparatus defined in claim 1, wherein
said reduced second resolution is substantially ¼ of said first resolution; and
said intermediate third resolution is substantially ½ of said first resolution.

11. In a system for decoding compressed image data in the form of pixel blocks representing an image at a first resolution to provide an image of a reduced second resolution, a method of decompressing a pixel block of said first resolution by:

selecting a sub-set of frequency domain coefficients in said pixel blocks of said compressed image data;

processing elements of said sub-set of frequency domain coefficients to provide pixel data representing pixels comprising a spatially distributed sub-set of pixels in a pixel block of said image at a first resolution and excluding other pixels of that pixel block, said processing including using data at an intermediate third resolution, lower than said first resolution but higher than said reduced second resolution, to supplement data from said reduced second resolution in forming prediction for motion compensation; and formatting said pixel data representing pixels comprising said spatially distributed sub-set of pixels to provide said image of said reduced second resolution.

12. A method according to claim 11 including the step of selecting different spatially distributed sub-sets of pixels for interlace and progressive image output.

13. A method according to claim 11 wherein said formatting step comprises,
upsampling said pixel data representing pixels comprising a spatially distributed sub-set of pixels to provide said image of said reduced second resolution.

14. A method according to claim 11 wherein said processing step includes the step of,
Selecting said spatially distributed sub-set of pixels based on desired PIP picture characteristic.

15. A method according to claim 14 wherein
said PIP picture characteristic comprises at least one of (a) PIP picture size, (b) whether said PIP picture is interlace or progressive, and (c) PIP picture vertical and horizontal pixel resolution.

16. A method according to claim 11 wherein said formatting step includes the step of,
adaptively filtering pixel data representing pixels comprising a spatially distributed sub-set of pixels using a filter function selected based on at least one of, (a) motion vector type, (b) group of picture (GOP) structure, (c) a GOP boundary transition, (d) whether I, B or P frame, and (e) whether interlace or progressive frame reduced second resolution output required.

17. A method according to claim 11 wherein said formatting step includes the step of,
adaptively filtering pixel data representing pixels comprising a selected spatially distributed sub-set of pixels using a filter function selected from at least one of, (a) a vertical pixel data filter, (b) a horizontal pixel data filter, (c) a chrominance data filter, and (d) luminance data filter.

18. In a system for decoding compressed image data in the form of pixel blocks representing an image of a first resolution to provide an image of a reduced second resolution, a method comprising the steps of:

generating data representative of an image pixel block at an intermediate third resolution lower than said first resolution but higher than said reduced second resolution;

generating motion compensated pixel block data at said third resolution from said pixel block data of said reduced second resolution supplemented by said intermediate third resolution data; and deriving pixel data representing said image of said reduced second resolution from said motion compensated pixel block data at said third resolution.

19. A method according to claim 18 wherein the steps of claim 18 are performed for P frames exclusively of I and B frames.

20. A method according to claim 18 wherein the steps of claim 18 are performed for P frames and one of, (a) I frames and (b) B frames.

21. A method according to claim 18 including the step of upsampling said pixel block data at said third resolution to provide image data of said first resolution.

22. A method according to claim 21 including the step of downsampling said upsampled pixel block data of said first resolution to provide image data of said second resolution.

23. A method according to claim 21 including the step of downsampling said upsampled pixel block data of said first resolution to provide said intermediate third resolution data.

24. A method according to claim 18 wherein
said pixel block data of said third resolution comprises residual data.

* * * * *